United States Patent [19]

Borth et al.

[11] Patent Number: 5,381,443
[45] Date of Patent: Jan. 10, 1995

[54] METHOD AND APPARATUS FOR FREQUENCY HOPPING A SIGNALLING CHANNEL IN A COMMUNICATION SYSTEM

[75] Inventors: David E. Borth, Palatine; John R. Haug, Arlington Heights; Phillip D. Rasky, Buffalo Grove, all of Ill.

[73] Assignee: Motorola Inc., Schaumburg, Ill.

[21] Appl. No.: 955,793

[22] Filed: Oct. 2, 1992

[51] Int. Cl.6 .............................. H04L 27/30
[52] U.S. Cl. .............................. 375/1; 380/34; 380/48; 370/95.1; 370/110.1; 455/33.1; 455/33.4
[58] Field of Search ............. 370/18, 19, 57, 84, 370/95.1, 105.1, 105.4, 107, 110.1, 111; 375/96, 1, 114, 115; 455/33.1–33.4; 380/34, 48

[56] References Cited

U.S. PATENT DOCUMENTS

| | | | |
|---|---|---|---|
| 4,554,668 | 11/1985 | Deman et al. | 375/1 |
| 5,210,771 | 5/1993 | Schaeffer et al. | 375/1 |
| 5,212,715 | 5/1993 | Pickert et al. | 375/114 |

Primary Examiner—Bernarr E. Gregory
Attorney, Agent, or Firm—Richard A. Sonnentag

[57] ABSTRACT

A cellular communication system hops both signalling channels and traffics channels in a common hopping sequence. To obtain system information from the frequency hopping signalling channel, a subscriber unit waits on a predetermined frequency, or carrier, until the frequency hopped signalling channel arrives at the predetermined frequency. Once arrived, the subscriber unit obtains synchronization information, and information related to the hopping sequence, from the signalling channel during the hop. The subscriber unit may then hop in tandem with the system, obtaining further system information in subsequent hops. The cellular communication system supports mobile assisted handoff (MAHO) by allowing a subscriber unit to measure signalling channel of neighboring cells in a similar manner, and using the measurements to assist in communication handoff from a source cell to a neighboring cell.

22 Claims, 7 Drawing Sheets

| timeslot | 10 | 1 | 2 | 3 | 4 | 5 | 6 | 7 | 8 | 9 | 10 | 1 |
|---|---|---|---|---|---|---|---|---|---|---|---|---|
| CCH C | TA | RA |   |   |   | TB | RB |   |   |   | TA | RA |
| tch1 |   | T | R | T | R |   | RB |   |   |   |   |   |
| tch2 |   |   | T | R |   |   | RB |   |   | T | R |   |
| tch3 |   | RA |   |   | T | R |   | T | R |   |   | RA |
| tch4 |   | RA |   |   |   |   | T | R | T | R |   | RA |

⋮ tch19

CCH C

FIG.10

| timeslot | 10 | 1 | 2 | 3 | 4 | 5 | 6 | 7 | 8 | 9 | 10 | 1 |
|---|---|---|---|---|---|---|---|---|---|---|---|---|
| tch1 |   | T | R | T | R |   | RB |   |   |   |   | T |
| tch2 | R |   | T | R |   |   | RB |   |   | T | R |   |
| tch3 |   | RA |   |   | T | R | T | R |   |   |   |   |
| tch4 |   | RA |   |   |   | T | R | T | R |   |   | RA |
| tch5 | T | R |   |   |   |   | RB |   | T | R | T | R |

⋮ tch20 tch1

METHOD AND APPARATUS FOR FREQUENCY HOPPING A SIGNALLING CHANNEL IN A COMMUNICATION SYSTEM

FIELD OF THE INVENTION

The present invention relates, in general, to communication systems and, more particularly, to frequency hopping communication systems.

BACKGROUND OF THE INVENTION

In current communication systems, and more particularly cellular communication systems, pedestrian users will access the cellular communication network. For purposes of this discussion, a pedestrian user is one who roams slowly (10 kph, kilometers per hour, or less) as opposed to a mobile (up to 100 kph or more) user. This mobile cellular network will provide the continual overhead measurements used by the system to maintain channel quality and perform hand-off functions.

Critical to the operation of the cellular communication system is the use of a signalling channel for transmission of system information to subscribers. The signalling channel has information transmitted to subscribers on logical channels which include a broadcast control channel (BCCH) having system information, a synchronization channel (SCH), a paging channel (PCH), a short message channel (SMCH), an access grant channel (AGCH), and a broadcast data channel (BDCH). In typical systems, however, the signalling channels have not supported either the frequency diversity or code-division multiple-access capabilities of frequency hopping. Using a fixed frequency RF carrier for signalling makes the signalling carrier the weak link of the system clue to difficulties encountered during planning/sharing of time division multiplexing (TDM) with traffic channels undergoing frequency hopping. A fixed frequency RF carrier for signalling also makes more efficient frequency reuse due to SFH/CDMA cumbersome and perhaps impossible.

Therefore, a need exists for a cellular communication system having a structure for a signalling channel which supports logical channels for broadcast, paging, synchronization, access and access grant while removing the above mentioned problems in a low complexity configuration.

DETAILED DESCRIPTION OF A PREFERRED EMBODIMENT

Figure 1:
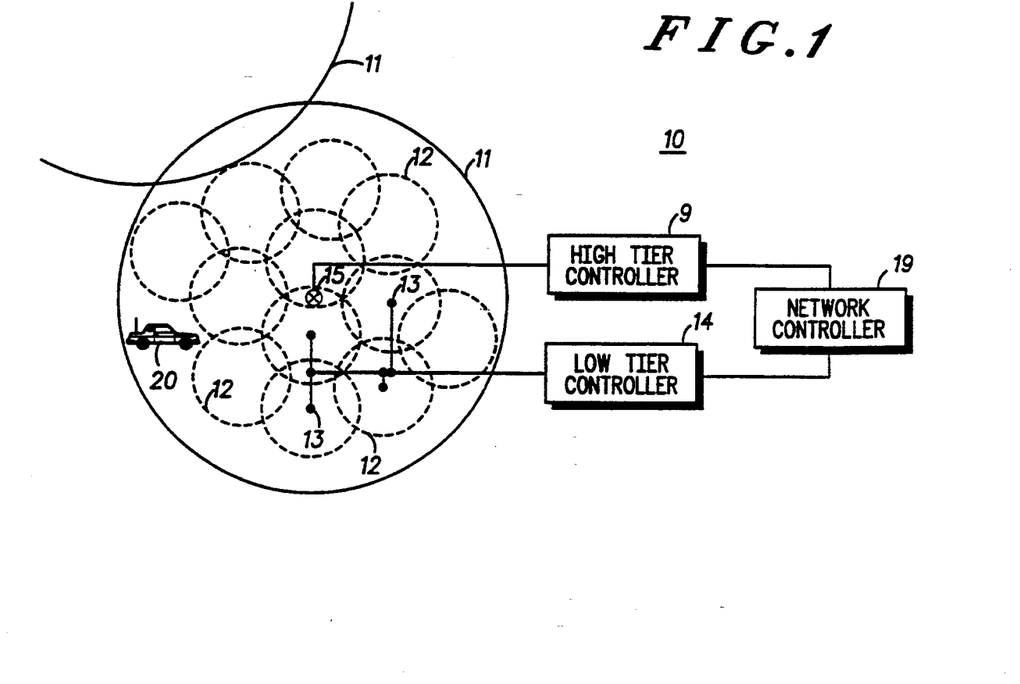
FIG. 1 generally illustrates a cellular communication system embodying the present invention.

Referring initially to FIG. 1, a communication system, and more specifically a cellular communication system 10, generally embodying the present invention is illustrated. Cellular communication system 10 consists of a plurality of low-tier cells 12, each having a base site 13, grouped in some form of traffic channel reuse pattern (21 cell, 7 cell, etc.). For purposes of this description, the term low-tier denotes a communication system which, in exchange for reduced operating cost, provides a lower delay, shorter range, and a rate of hand-off suitable for pedestrian traffic when compared to present day cellular systems. In addition to the low-tier pedestrian portion of the system, there is a need to have the mobile cellular system function as a high-tier portion of the PCS. For purposes of this description, the term high-tier denotes a communication system which provides at least the same type of performance, range and hand-off capability as present day cellular systems. This high-tier system is represented by cells 11, having a base site 15, which, in this preferred embodiment, are in a single cell reuse pattern. The high and low-tier systems function together to provide a transparent single service to the user. The low-tier system being controlled by a low-tier controller 14 and the high-tier by controller 9. Optionally, an overall network controller 19 is provided. Controller 19 may be comprised of portions of controllers 14 and 9.

An example of this is a pedestrian user who is walking down a street using an RF telephone in the low-tier system. The user then, during a call, enters a vehicle and drives off. The system must be able to determine that a change has occurred and transfer the call frown the low-tier system to the high-tier system in a fashion transparent to the user.

As an alternative, the user may desire to control the mode of the subscriber unit. To provide this, a manual switch, or soft key, is provided on the subscriber unit for the user to change between high and low-tier. In the scenario provided above, when the pedestrian enters the vehicle and drives off, the call would be discontinued by the low-tier system once the user reached a speed beyond the capability of the low-tier system.

In a further alternative, a reduced price subscriber unit can be provided which only has low-tier capability. This type of unit would be used in roaming situations (e.g. home, work, shopping, etc.); but would not function with the high-tier system. A cost saving would result from the ability to eliminate various components from the subscriber unit (such as forward error correction and interleaving).

However, in order to eliminate the need to carry multiple phones, or dual mode phones, it is desirable to provide a dual mode system in which the high-tier and low-tier systems are compatible with each other such that a single transceiver (subscriber unit) can be utilized. Therefore, the present invention provides a dual mode system wherein the traffic channel protocols for each system operate on the same frame structure so that a single subscriber can be provided to operate at either mode.

In Table 1 below, the specifications for the traffic channels for the low-tier (pedestrian) and high-tier (mobile) systems are provided.

TABLE 1

| DUAL MODE TRAFFIC CHANNEL PROTOCOLS | | |
| --- | --- | --- |
| SPECIFICATION | LOW-TIER | HIGH-TIER |
| SPEECH CODER | 32 kbps ADPCM | 16 kbps LD-CELP |
| Forward Error Cor. | NONE | RATE ½ |
| BIT RATE | 500 kbps | 500 kbps |
| CHANNEL SPACING | 400 KHz | 400 KHz |
| ACCESS METHOD | TDM/TDMA 10 SLOTS | SFH-CDMA 10 SLOTS |
| FRAME DURATION | 2 ms | 2 ms |
| TRAFFIC CHANNELS | 750 | 750 |
| MODULATION | QPSK | QPSK |
| CONTROL CHANNEL | YES, DEDICATED SLOT | YES, DEDICATED SLOT |
| DUPLEX METHOD | FREQUENCY DIVISION | FREQUENCY DIVISION |
| HAND-OFF CAPABILITY | YES | YES |
| DIVERSITY | SWITCHED ANTENNA | MAX RATIO COMBINING |
| FREQUENCY HOPPING | NO | YES |
| TX POWER (AVG) | 10 mW | 100 mW |

In the low-tier (pedestrian) communication system, a traffic channel protocol using a 32 kbps (kilobits per second) ADPCM (Adaptive Delta Pulse Code Modulated) speech coder is utilized to provide toll quality calls. No error correction or equalization is required in the low-tier system. In the high-tier system, a 16 bit LD-CELP (Low Delay—(Code Excited Linear Predictive) speech coder is used with a rate ½ forward error correction (FEC). However, a 32 kbps ADPCM using two slots per frame or an 8 kbps coder using one slot in every other frame would also provide acceptable high-tier coding alternatives.

Figure 2:
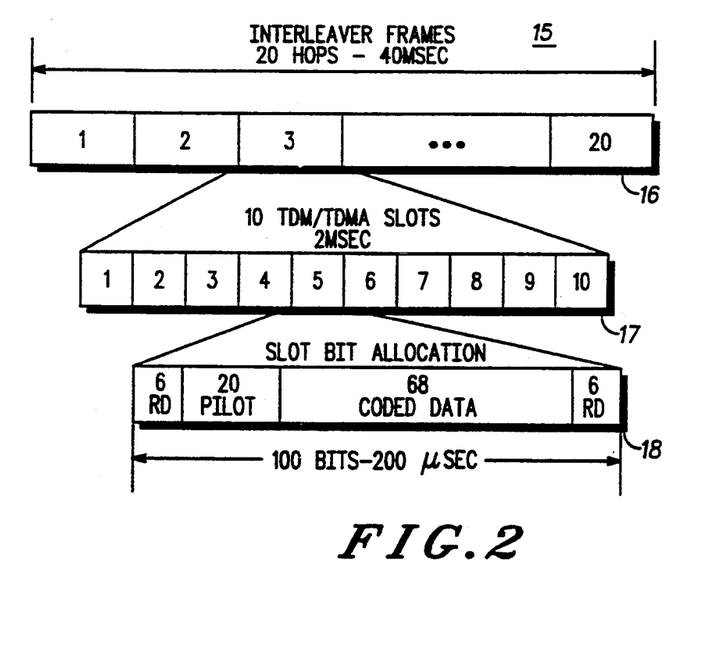
FIG. 2 is a frame structure for a low-tier communication system embodying the present invention.

As can be seen from TABLE 1, and as illustrated in FIG. 2, the frame, generally designated 15, for the high-tier system is a 20 hop interleaver frame 16. Each hop consists of a 10 slot TDMA (Time Division Multiple Access) frame 17. Each TDMA frame consists of 100 bits which consists of 6 ramp up bits, 20 pilot bits, 68 coded data bits (speech bits), and 6 ramp down bits. The 68 speech bits consist of interleaved speech, FED, and signalling bits. Each slot is 200 μsec (microseconds)-long. This results in a TDMA frame being 2 msec (milliseconds) and the interleaver frame being 40 msec. Since this protocol utilizes both slow frequency hopping code division multiple access (CDMA) (i.e. the hopping sequence) combined with a time division multiple access method (TDMA) (multiple slot configuration) this protocol could best be characterized as a combination CDMA/TDMA method.

Figure 3:
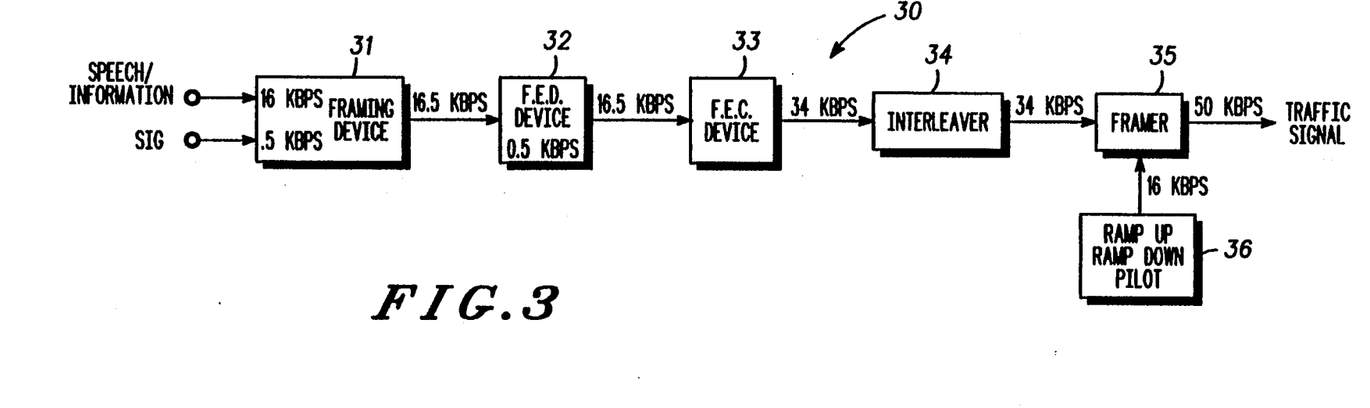
FIG. 3 is a block diagram illustrating the operation of a high-tier modem embodying the present invention.

A block diagram of the operation of a high-tier modem, generally designated 30, is illustrated in FIG. 3. A speech/information signal is received at one input of a framing device 31 and a signalling signal is received at a second input. In the preferred embodiment the speech is received at 16 kbps and the signalling at 0.5 kbps. The output from framing device 31 is a 16.5 kbps signal. This frame is input to a forward error detection (FED) device 32 which adds an additional 0.5 kbps signal onto the 16.5 kbps signal from framer 31. The output from FED 32 is input to a forward error correction (FEC) device 33. This takes the 17 kbps input and codes it to provide a 34 kbps output signal. The 34 kbps signal is then interleaved in interleaver 34. The ramp up, pilot, and ramp down bits (16 kbps), block 36, are then added, in framer block 35, to the signal frame which provides the 50 kbps traffic channel output. This compares with the 100 bit slots provided in FIG. 2 since the frames in FIG. 2 are 2 ms each or 500 frames per second. With each frame being 100 bits, the rate calculates out to the same 50 kbps figure. Likewise, the 32 bits per frame provided for ramping and pilot bits would be 16 kbps for 500 frames per second.

Figure 4:
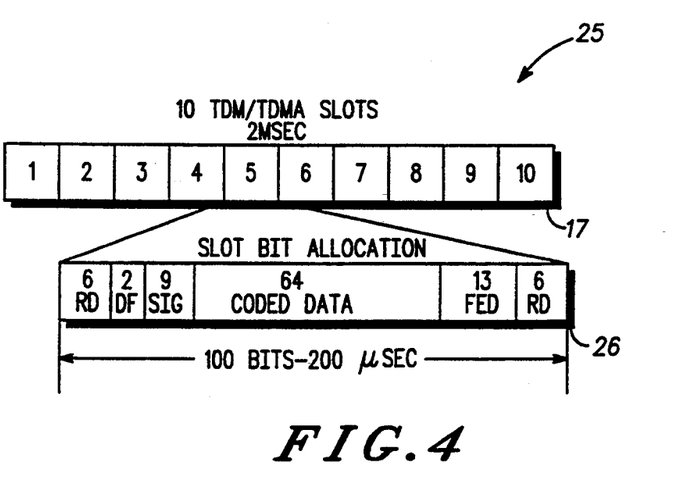
FIG. 4 is a frame structure for a high-tier communication system embodying the present invention.

Referring now to FIG. 4, a low-tier frame, generally designated 25, is illustrated. Since the low-tier system is not hopped, there is no interleaving frame set. Therefore, the highest order frame in the low-tier system is TDMA frame 17, having 10 slots. As in the high-tier system, each slot contains 100 bits which consists of the 6 ramp up bits, 2 differential bits, 9 signalling bits, 64 speech bits, 13 FED bits, and 6 ramp down bits. Also, as with the high-tier system, each slot has a duration of 200 μsec, making each TDMA frame 2 msec. While the transmission frown the subscriber is a TDMA protocol, the transmissions from the base site may be either TDMA, where only the needed slots are used, or time division multiplexed (TDM) where all of the slots are filled whether being actively used or not. Therefore, the low-tier system could be characterized as having either a TDMA or a TDM/TDMA protocol.

Figure 5:
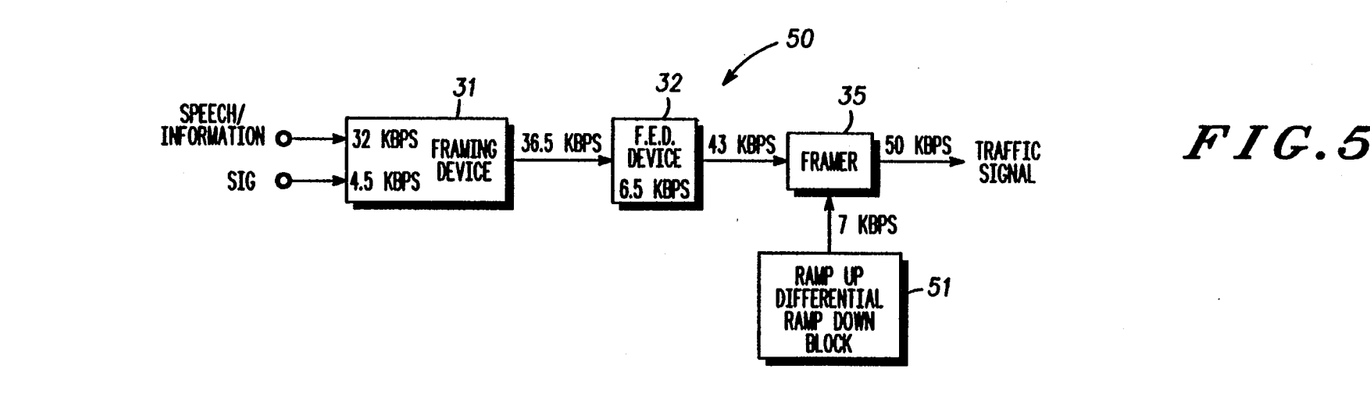
FIG. 5 is a block diagram illustrating the operation of a low-tier modem embodying the present invention.

In FIG. 5, a block diagram of the operation of a low-tier modem, generally designated 50, is illustrated. The low-tier modem uses many of the same functions as the high-tier modem, which may or may not operate in the same fashion. In FIG. 5, framing device 31 receives the speech signal at 32 kbps and the signalling information at 4.5 kbps. These are combined in framer 31 to form a 36.5 kbps signal. The 36.5 kbps signal is provided to FED 32 which adds 6.5 kbps for error detection. The resulting 43 kbps is added, in framer block 35, to a 7 kbps signal consisting of ramp up, differential, and ramp down bits, block 51. This results in a 50 kbps traffic signal.

As can be seen in a comparison of FIGS. 2 and 4, the low-tier TDMA frame set matches the TDMA portion of the CDMA/TDMA frame set utilized by the high-tier. By utilizing the same frame sets in both the high and low-tier systems, a single transceiver can be designed to operate in both tiers which utilizes many of the same components, making a smaller, less expensive communication unit possible.

Figure 6:
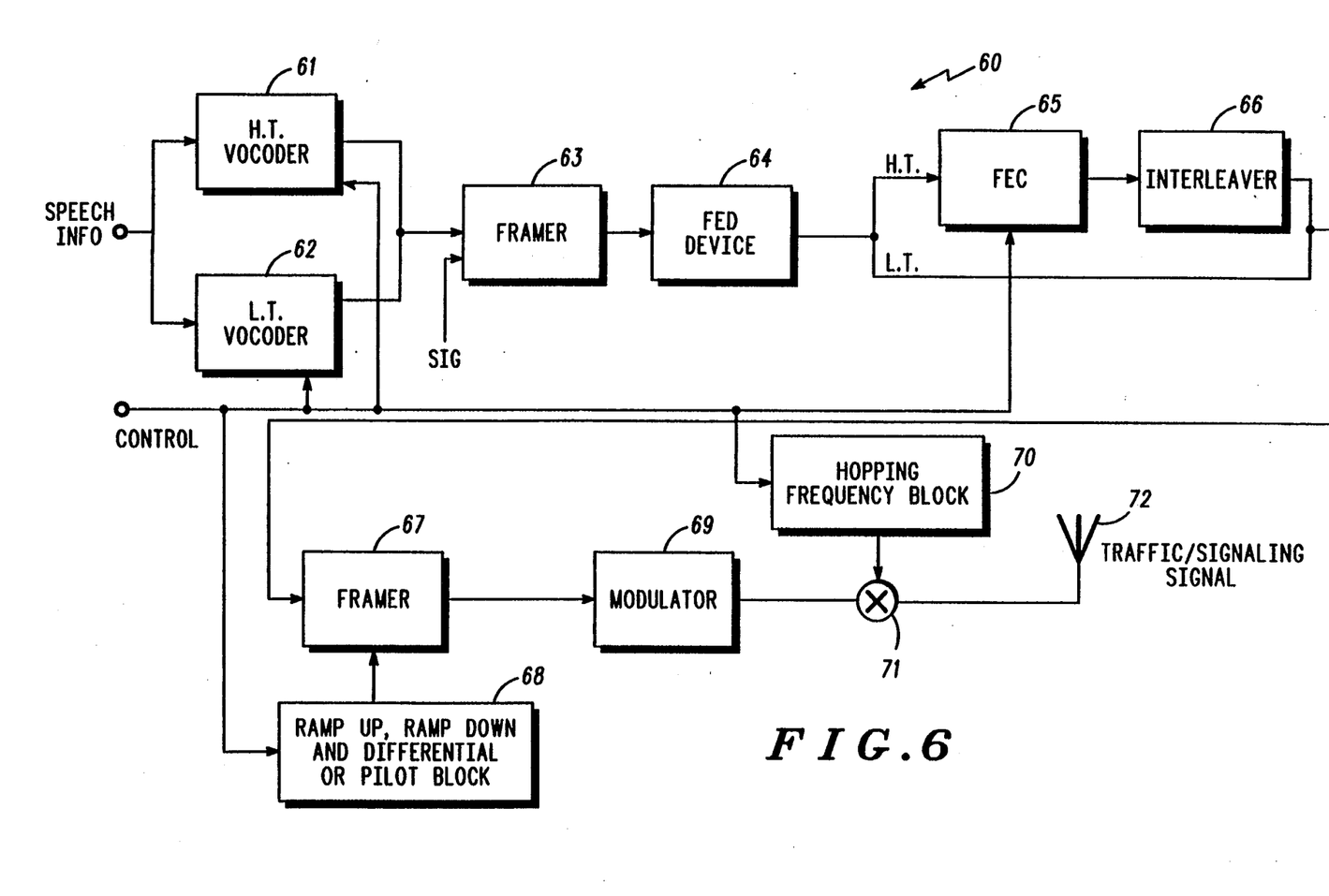
FIG. 6 is a block diagram of the transmit side of a modem embodying the present invention.

A block diagram of the transmit portion, generally designated 60, of a modem for use in a dual mode system is illustrated in FIG. 6. A received speech/information signal enters the modem and is presented to a high-tier vocoder 61 and a low-tier vocoder 62. In a preferred embodiment, high-tier vocoder 61 is a 16 kbps LD-CELP vocoder and low-tier vocoder 62 is a 32 kbps ADPCM vocoder. The speech signal will be processed by whichever vocoder is selected by the control input. The coded signals are then framed in framer 63 and have the forward error detection bits added in FEC 64 device.

If the modem is operating in the high-tier system (as designated by the control signal), the framed signal has bits added for forward error correction in FED 65 device and is interleaved in interleaver 66. Following interleaver 66 for the high-tier, or FED 64 for the low-tier, the ramp up, ramp down, and differential or pilot bits are added to the signal in framer 67. The signal is then modulated in modulator 69. The type of modulation scheme used will be a form of QAM (Quadrature Amplitude Modulation) modulation, such as Quadrature Phase Shift Keyed (QPSK), $\pi/4$ QPSK, Offset QPSK, Differential QPSK, Filtered QPSK, etc.. In the preferred embodiment, the modulation scheme is Filtered QPSK. If the modem is operating in the high-tier mode, it is then mixed, in mixer 71, with the hopping frequency from block 70. The signals are then output through an antenna 72.

Figure 7:
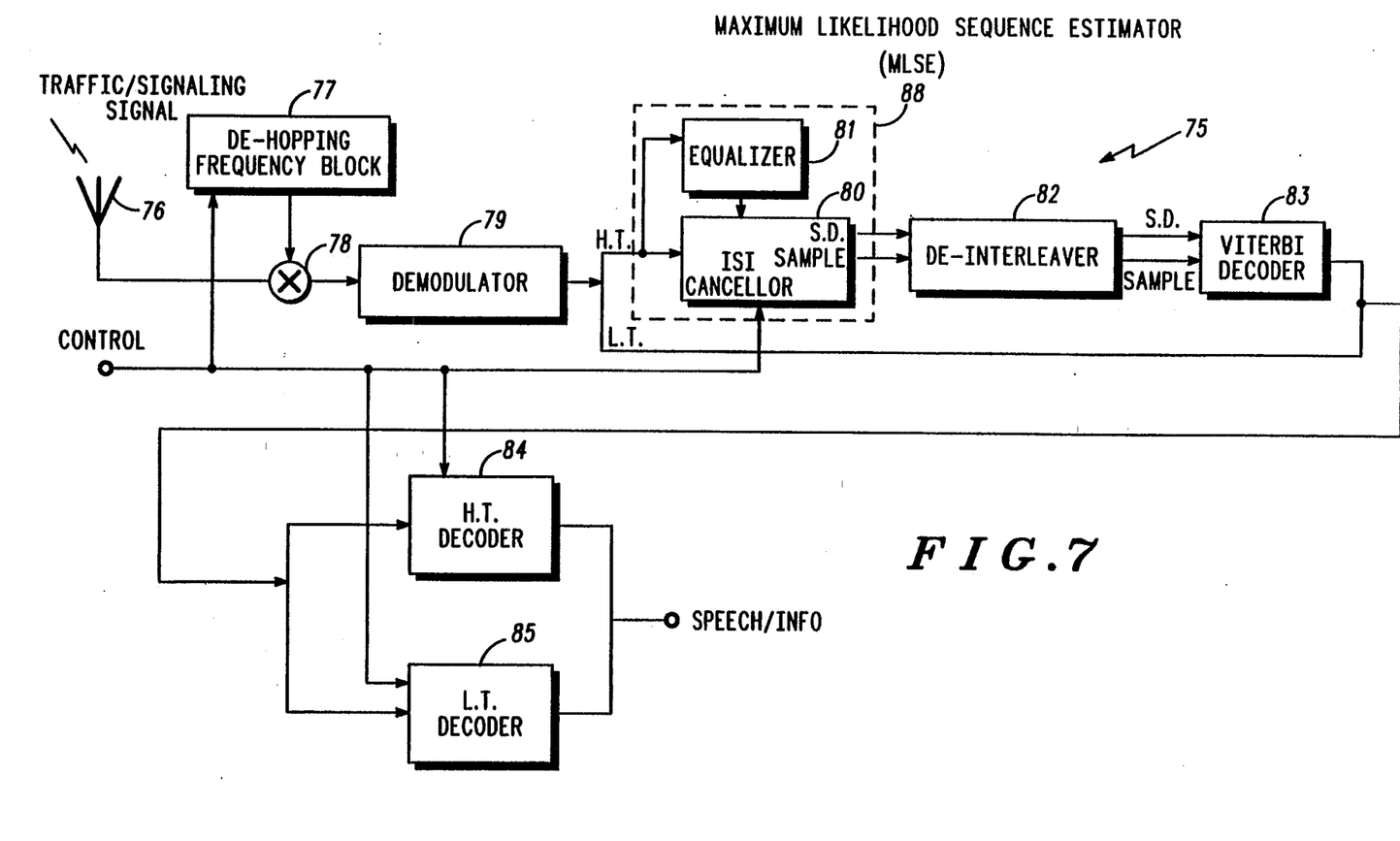
FIG. 7 is a block diagram of the receive side of a modem embodying the present invention.

In FIG. 7, a block diagram of the receive side, generally designated 75, of the modem is illustrated. In operation, a traffic signal is received at antenna 76. If operating in the high-tier mode (as designated by the control input), the signal is mixed, in mixer 78, with a de-hopping frequency, block 77. The signal is then demodulated in block 79.

In a delay spread spectrum environment, multiple rays of a given signal will be received at different times/phases resulting from reflections of the signal frown various objects (e.g. buildings, mountains). Therefore, for a modem operating in the high-tier mode, the signal is provided to a Maximum Likelihood Sequence Estimator (MLSE) 88 which consists of an equalizer 81 and an InterSymbol Interference (ISI) canceller 80. Equalizer 81 looks at the sum of the whole received signal and determines where the main signal lies. The output of equalizer 81 is a set of "hard decisions", or logical 0's and 1's, which are input to ISI canceller 80. ISI canceller 80 takes the "hard decision" output from equalizer 81 and uses the output to eliminate the intersymbol interference from the input signal. The resulting sample signal and a set of "soft decisions" from ISI canceller 80 are de-interleaved in de-interleaver 82 and then provided to a Viterbi decoder 83 for decoding.

Following decoder 83, or demodulator 79 if in low-tier mode, the signal is decoded in the appropriate decoder 84 or 85. The speech signal is then output from the modem.

Figure 8:
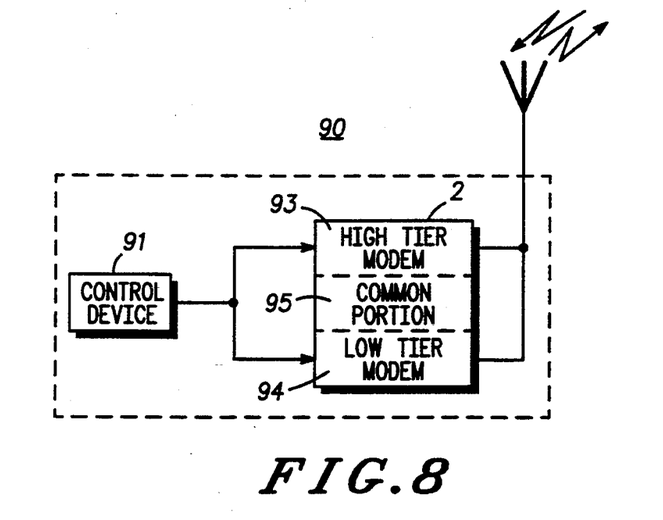
FIG. 8 is a block diagram of a modem embodying the present invention.

In FIG. 8, a general block diagram of a modem, generally designated 90, which will operate in either high-tier or low-tier is illustrated. Modem 90 consists of a high-tier portion 93, a low-tier portion 94, and a common portion 85 of components which are used in both the high and low-tiers. The operation of modem 90 is controlled by a control device 91.

Control device 91 may operate based upon one or more parameters to select whether modem 90 operates in high or low-tier. In one example, control device 91 may be a simple manual switch which the user controls to set modem 90 into either high-tier or low-tier operation. Alternatively, control device 91 may base the selection on availability of the low-tier. For example, if the user is not within an area having low-tier coverage (e.g. a sparsely populated area), control 91 device would have to select the high-tier to obtain service.

Another control parameter would be the bit error rate (BER). If the BER were excessive, control 91 would select the high-tier. In another example, the user may start in the low-tier mode and be transitioned, or handed-off, to the high-tier mode when the users speed increased to a level where the BER was unacceptable. Measuring the carrier-to-interference (C/I) ratio would have the same effect.

Slow frequency hopping (SFH) has been employed in previous cellular systems. One such system is the Groupe Special Mobile (GSM) Digital Cellular System. In this implementation, the signalling channels have not supported either the frequency diversity or code-division multiple access (CDMA) capabilities of frequency hopping. GSM, for example uses a fixed frequency RF carrier for all logical channels such as broadcast channels, paging channels, synchronization channels, random access channels, and dedicated control channels. Using a fixed frequency RF carrier for signalling makes the signalling carrier the weak link of the system and makes more efficient frequency reuse due to SFH/CDMA cumbersome and perhaps impossible. Furthermore, a dedicated, fixed frequency RF carrier is difficult to plan and share via TDM with hopping channels supporting traffic.

Referring to FIG. 2, there is shown a channel framing structure which supports frequency hopping of a signalling channel in a cellular communication system in accordance with the invention. The framing structure supports logical channels comprising, inter alia, broadcast channels, paging channels, synchronization channels, access and access grant channels, while removing the above mentioned problems, and also maintains low complexity. The high-tier structure, depicted in FIG. 2, and described above, maintains the basic physical layer compatibility with the low-tier system, while supporting mobile-assisted handoff (MAHO) with high reliability.

To maintain compatibility with the low-tier system, N time slots, where N equals 10 in the preferred embodiment are multiplexed onto each TDMA frame 17. The overall channel bit rate is 500 kb/s, where each time slot accounts for 50 kb/s. The 50 kb/s per time slot supports 32 kb/s of data, however, with FEC coding significantly less throughput is attainable. For future systems, it is important to support services at multiple data rates. The full rate service for speech is to be based on 32 kb/s ADPCM. With rate ½FEC coding, 2 time slots out of 10 are required. Speech coders at data rates of 16, 8, and even 4 kb/s are also to be supported to enhance system capacity.

The basic multiple-access to the signalling channel is a hybrid of TDMA and SFH/CDMA. From the perspective of base-station 15, each TDMA frame 17 represents a dwell, or frequency hop. A sequence of contiguous TDMA frames hop RF carriers based on a frequency hopping pattern, or hopping sequence.

Figure 9:
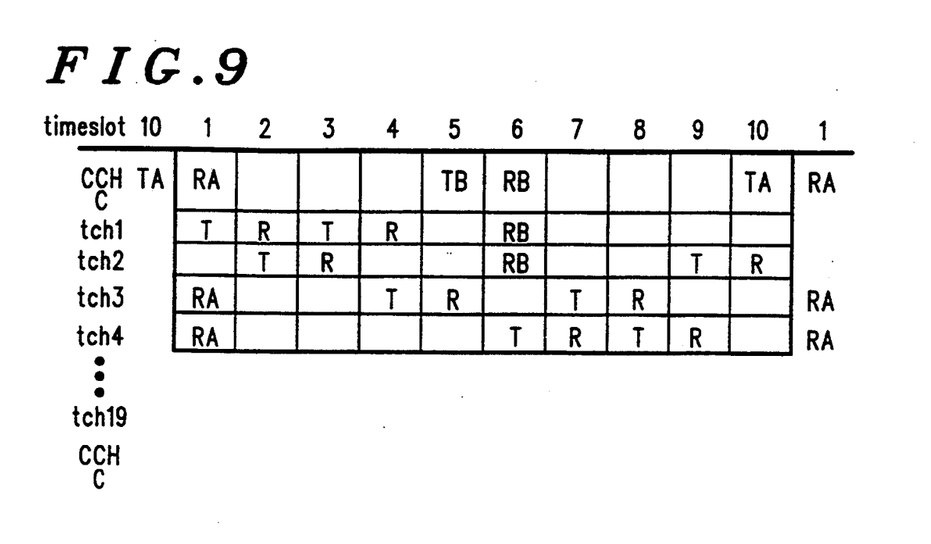
FIG. 9, generally depicts a channel framing structure which supports signalling channel frequency hopping in accordance with the invention.

Relative to links of other cells, multiple access is accomplished via code division. Assignments of hopping sequences to adjacent cells is done to provide minimal correlation between potential inter-cell interferers. To support this concept of CDMA, a signalling channel frequency hops in accordance with the invention. Referring to FIG. 9, there is shown a channel framing structure which supports signalling channel frequency hopping in accordance with the invention. A signalling channel, which in the preferred embodiment is labelled a common control hopping carrier (CCHC), hops in coordination with the above mentioned design by a unique mapping of the CCHC onto the basic hybrid SFH/TDMA carrier (FIG. 2). All traffic channels supporting data rates of 32 kb/s or less may scan the CCHC of the home cell and those of adjacent cells without interruption to the traffic channel link. In this manner, the high-tier communication system is able to perform frequency hopping of a plurality of traffic channels over a hopping sequence, and is also capable of frequency hopping the signalling channel, or CCHC, within the same hopping sequence. In this scenario the advantages of frequency hopping are obtained by the signalling channel while the system is still able to maintain the logical channel functionality.

FIG. 9 generally depicts a sample structure of a hopping SFH/TDMA carrier which includes a CCHC and four traffic channels supporting 32 kb/s from the perspective of the subscriber unit 20. The time slots marked with a "T" and "R" represent the subscriber unit 20 transmit and receive time slots, respectively, for a given traffic channel ($TCH_i$). Each TCH assignment for full rate speech is constructed from two T/R pairs, which allows easy migration to sub-rate services. In the row denoted CCHC, RA and RB are the first and second time slots used by the cell to broadcast various control information. Important to note is that TCH1, 2, 3, and 4 can receive RA or RB with at least one time: slot of gap to allow for synthesizer switching. Time slots denoted TA and TB support inbound access requests from a subscriber unit 20 in the idle mode.

As depicted in FIG. 9, RA and RB are equally spaced from one another, and in the preferred embodiment are N/2 time slots from one another within a TDMA frame 17. In the preferred embodiment, a first tinge slot, time slot 1 of row CCHC, contains synchronization information which is known by subscriber unit 20. A second time slot, time slot 6 of row CCHC, contains information related to the hopping sequence being transmitted by base-station 15. Since synchronization must be performed before the hopping sequence can be obtained, the first time slot, time slot 1 must always precede the second time slot, time slot 6.

Figure 10:
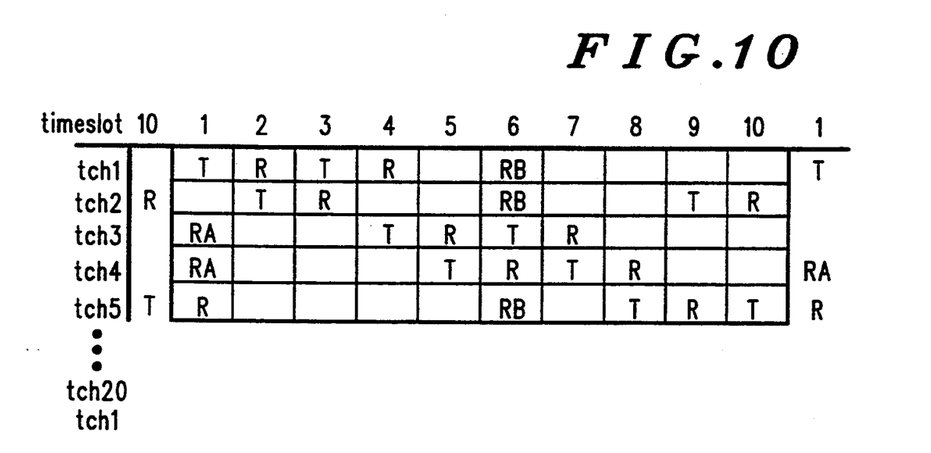
FIG. 10 generally depicts an alternate embodiment of a channel framing structure which supports SFH/TDMA frequency hopping which includes 5 traffic channels supporting 32 kb/s speech in accordance with the invention.

FIG. 10 generally depicts a framing structure which supports SFH/TDMA frequency hopping which includes 5 traffic channels supporting 32 kb/s speech in accordance with the invention. Again, FIG. 10 is from the perspective of subscriber unit 20. Also important to note is that all five TCH's can scan either RA or RB from this framing structure of FIG. 9, without conflict of the traffic channel. The framing structure of FIG. 9 which supports CCHC may be from the home cell, or adjacent cells, given that subscriber unit 20 knows the adjacent hopping sequence. The framing structure of FIG. 10 does not support the CCHC, but instead provides up to 5 additional TCH's per hopping carrier. The first carrier installed into a cell site supports the CCHC utilizing the framing structure of FIG. 9, while the remaining carriers installed at a cell site are supported by the framing structure of FIG. 10. Support for 16 kb/s and lower rate speech is much easier than support for the full-rate service. Consequently, any split of the TCH framing structure depicted in FIG. 10 will result in RA or RB being free to scan.

To assist system acquisition and mobile assisted handoff (MAHO), the CCHC is not power controlled or subject to discontinuous transmission or variable rate operation. The main logical channels of the CCHC are: broadcast control channel (BCCH), system information; synchronization channel (SCH), facilitates rapid carrier, timing, and hopping acquisition; paging (PCH); short message channel (SMCH); access grant channel (AGCH); and broadcast data channel (BDCH), e.g., traffic information, weather, emergency information, stock market information, . . .

For a given hopping sequence vector $c=[c_1, c_2 \ldots c_i, \ldots c_n]$, the SCH occurs at least every time the RF carrier of the dwell $c_i$ is an element of $C_0$. In the preferred embodiment, $C_0$ is a set of minimum required RF carriers to be used in the system. In the most basic configuration, $C_0$ may contain only a single RF carrier, while the high-tier system may hop over a multitude of RF carriers from TDMA frame to TDMA frame. Before accessing the system, the subscriber unit has no a priori knowledge of the hopping sequence. To access the SFH/TDMA high-tier communications system, the subscriber unit 20 may access a carrier out of the carriers comprising $C_0$, acquire synchronization to the CCHC when the RF carrier has the CCHC hopped thereon, and may obtain, after synchronization has been acquired, information related to the hopping (i.e., the RF carriers to hop over anti the corresponding hopping sequence) from the CCHC. Since each time slot carries only a limited amount of information, the SCH must be distributed over two time slots, a first time slot containing synchronization information and the second time slot having information related to the hopping sequence. Consequently, after subscriber unit 20 has accessed the appropriate TDMA frame having the CCHC hopped thereon, synchronization has been acquired and enough information related to the hopping sequence has been obtained for the subscriber unit 20 to hop in tandem with the high-tier communications system. Alternatively, where not enough information related to hopping can be obtained in one SCH, the information related to the hopping sequence may be encoded over a multitude of SCH's. In this scenario, subscriber unit 20 would acquire multiple SCH's and gradually decode, and obtain, information related to the hopping sequence.

As a further example, the high-tier communications system may utilize a total of 30 RF carriers, as depicted in interleaver frame 16 of FIG. 2. $C_0$ may include, for example, 3 of those 30 RF carriers. Subscriber unit 20 can then camp on one of the 3 carriers of $C_0$ to attempt acquisition to the system, and can eventually find the best cell to camp on based on quality measurements determined after hopping on each CCHC. In the preferred embodiment, an average of 1 in 10 SFH/TDMA frames on the CCHC will be dedicated to the SCH. Use of multiple carriers of $C_0$ are suggested to reduce the susceptibility of the system to outside interference, or jamming. Subscriber unit 20 may attempt acquisition on some, or all, of the carriers of $C_0$. In addition, this concept also supports a frequency plan by distributing the carriers of $C_0$ over the frequency plan, whereby the set $C_0$ is divided evenly and distinctly into subsets. The subsets may be distributed in a reuse plan over a group of adjacent cells in order to minimize interference. $C_0$ should always include a couple of basic RF carriers which are mandatory for all system configurations. Additional elements can be added to $C_0$ as the system requires, and may be broadcast to the subscriber unit 20 on the BCCH.

Figure 12:
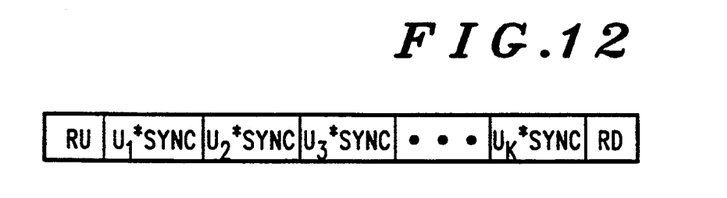
FIG. 12 generally illustrates a low complexity, long training sequence generated from the repetition of several short synchronization patterns.

The SCH maps onto a RA/RB pair (or is distributed over two time slots) as depicted in FIG. 9. RA consists of synchronization, or a training sequence 20, which may be detected by many means. In the preferred embodiment, the training sequence 20 is detected with a matched filter. RB contains a normal burst (short synchronization information followed by data) with enough information to align to the hopping pattern. A low complexity, long training sequence can be generated from the repetition of several short synchronization patterns. This concept is depicted in FIG. 12. RU and RD denote ramp-up and ramp-down. SYNC denotes a marker, or synchronization pattern of short length (less than or equal to 10 symbols) suitable for matched filter reception. $u_i$ denotes a binary sequence. Use of a suitable binary sequence prevents acquisition to a shift of the SCH structure. Since the SCH is entirely known, it may be used as a pilot for frequency correction as well as timing acquisition.

The BCCH, PCH, AGCH, and BDCH and access channels are mapped onto the CCHC in time division out of a superframe structure with interleaved FEC coding. A slotted mode of operation is easily accommodated with these structures. Subscriber units, such as subscriber unit 20, may monitor the CCHC discontinuously based on its assigned paging group which could be a function of a personalized subscriber unit identification number.

Figure 11:
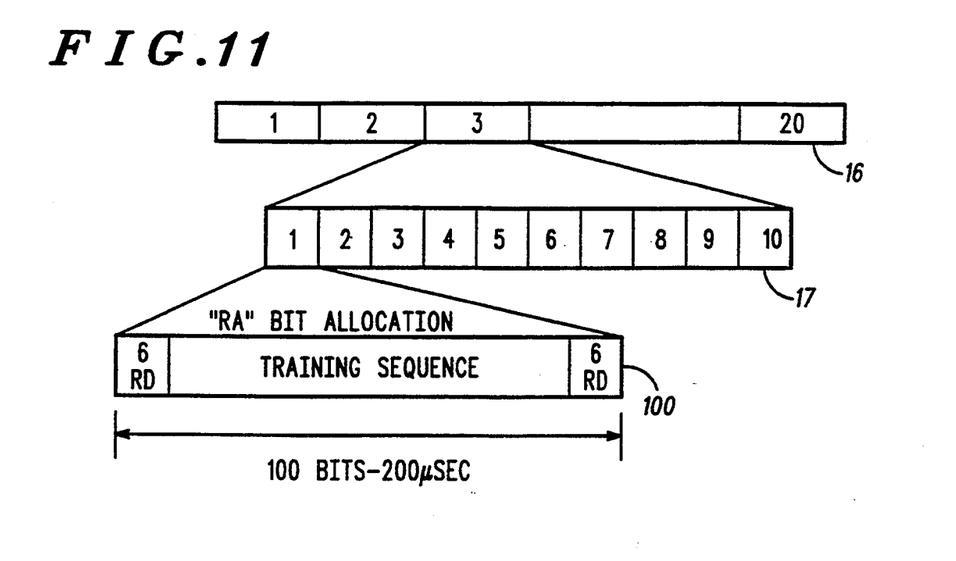
FIG. 11 generally depicts a channel framing structure which conveniently accommodates mobile assisted handoff (MAHO) in accordance with the invention.

The framing structure depicted in FIG. 11 conveniently accommodates mobile assisted handoff (MAHO) in accordance with the invention. As previously stated, subscriber unit 20 is capable of monitoring each CCHC. Consequently, by using this structure, any full-rate or sub-rate traffic channel can scan a CCHC of an adjacent cell each TDMA frame. Frequency hopping is known to mitigate the effects of slow fading and provide interference averaging. Since the CCHC is hopping, the measurement of any one cell can be done very quickly (e.g., 10 frames if hopping every 10 frames) without the effects of slow fading or worst case interference tainting the measurement. Furthermore, since each TDMA frame contains a training sequence 100, the quality measurement of the CCHC used for MAHO may be made over only the training sequence without having to buffer or process an entire time slot. The same hardware used to channel sound the traffic channel, FIG. 7, is used to sound the adjacent cell CCHC. In the preferred embodiment, the receiving hardware is a matched filter receiver such as that depicted in FIG. 7.

If a first CCHC is used in a predetermined coverage area, such as the home or source coverage area, a second CCHC may be used as a signalling channel of a neighboring coverage area. In this manner, a subscriber unit 20 is capable of measuring the first CCHC, which is the home predetermined area and a second CCHC which is that of a neighboring coverage area. Subscriber unit 20 is capable of synchronizing to both the first and second CCHC corresponding to the home coverage area and neighboring coverage area respectively using the training sequence 100, depicted in FIG. 11, of each of the first and second carrier. By measuring a CCHC of either the home or neighboring coverage area as it hops over many RF carriers, quality measures such as mean carrier-to-interference ratio (C/I), medium C/I, worst C/I, bit error rate (BER) before decoding, C/I density, etc., may be performed for purposes of communications handoff. The most useful of the above-mentioned measurements would be the BER of the adjacent control channel. Using BER as the quality measurement to compare/contrast the home versus neighbor channel quality, MAHO can be easily implemented using the framing structure of FIG. 2 and FIG. 11 in the high-tier communications system.

Thus, it will be apparent to one skilled in the art that there has been provided in accordance with the invention, a method and apparatus for frequency hopping a control channel in a communication system that fully satisfies the aims and advantages set forth above.

While the invention has been described in conjunction with specific embodiments thereof, it is evident that many alterations modifications, and variations will be apparent to those skilled in the art in light of the foregoing description. Accordingly, it is intended to embrace all such alterations, modifications and variations in the appended claims.

What we claim is:

1. A method of accessing a frequency hopping time division multiple access communication system, the communication system frequency hopping from TDMA frame to TDMA frame, the method comprising the steps of:
    accessing a carrier out of a plurality of carriers, said plurality of carriers having a signalling channel and a plurality of traffic channels frequency hopped thereon utilizing a hopping sequence;
    acquiring synchronization to the signalling channel when said carrier has the signalling channel hopped thereon; and
    obtaining, after synchronization has been acquired, information related to said hopping sequence from said signalling channel.

2. The method of claim 1 wherein said step of acquiring synchronization to the signalling channel further comprises acquiring synchronization to the signalling channel during a first timeslot of N timeslots multiplexed onto a TDMA frame.

3. The method of claim 2 wherein said step of obtaining information related to said hopping sequence further comprises the step of obtaining information related to said hopping sequence during a second timeslot of said plurality of timeslots multiplexed onto said TDMA frame.

4. The method of claim 1 wherein said first timeslot and second timeslot are spaced N/2 timeslots from one another.

5. The method of claim 1 wherein said signalling channel contains sub-channels from the group of sub-channels consisting of Broadcast Signalling channel (BCCH), Synchronization Channel (SCH), Paging Channel (PCH), Short Message Channel (SMCH), Access Grant Channel (AGCH), and Broadcast Data Channel (BDCH).

6. The method of claim 1 wherein said step of obtaining information related to said hopping sequence further comprises the step of obtaining information related to said hopping sequence over a multitude of TDMA frames.

7. A frequency hopping time division multiple access base-station, the base-station employing a signalling channel and a plurality of traffic channels, the base-station comprising:

means for producing a hopping sequence for frequency hopping from a TDMA frame to a subsequent TDMA frame; and means, coupled to said means for producing a hopping sequence, for transmitting both the signalling channel and the plurality of traffic channels in a frequency hopping manner utilizing said determined hopping sequence.

8. The base-station of claim 7 wherein said means for transmitting both the signalling channel and the plurality of traffic channels further comprises means for distributing the signalling channel over two timeslots out of N timeslots multiplexed onto a TDMA frame.

9. The base-station of claim 8 wherein said means for distributing the signalling channel over two timeslots out of N timeslots multiplexed onto a TDMA frame further comprises means for distributing the signalling channel over two timeslots spaced N/2 timeslots from one another within said TDMA frame.

10. The base-station of claim 9 wherein a first timeslot of said two timeslots contains synchronization information and a second timeslot of said two timeslots contains information related to said hopping sequence.

11. The base-station of claim 10 wherein said first timeslot precedes said second timeslot.

12. A subscriber unit which accesses a frequency hopping time division multiple access communication system, the communication system frequency hopping from TDMA frame to TDMA frame in a predetermined coverage area, the subscriber unit comprising:

means for accessing a carrier out of a plurality of carriers, said plurality of carriers having a signalling channel and a plurality of traffic channels frequency hopped thereon utilizing a hopping sequence;

means, coupled to said means for accessing, for synchronizing to the signalling channel when said carrier has the signalling channel hopped thereon within the predetermined coverage area and means, after synchronization has been acquired, for obtaining information related to said hopping sequence from said signalling channel.

13. The subscriber unit of claim 12 wherein said means for synchronizing to the signalling channel further comprises means for synchronizing to the signalling channel during a first timeslot of N timeslots multiplexed onto a TDMA frame.

14. The subscriber unit of claim 13 wherein said means for obtaining information related to said hopping sequence further comprises means for obtaining information related to said hopping sequence during a second timeslot of said plurality of timeslots multiplexed onto said TDMA frame.

15. The subscriber unit of claim 12 wherein said first timeslot and second timeslot are spaced N/2 timeslots from one another.

16. The subscriber unit of claim 12 wherein signalling channel contains sub-channels from the group of sub-channels consisting of Broadcast Signalling channel (BCCH), Synchronization Channel (SCH), Paging Channel (PCH), Short Message Channel (SMCH), Access Grant Channel (AGCH), and Broadcast Data Channel (BDCH).

17. The subscriber unit of claim 12 wherein said means for synchronizing further comprises means for synchronizing, via a training sequence, to the signalling channel of a neighboring coverage area during a timeslot out of N timeslots multiplexed onto a TDMA frame when a carrier having the signalling channel hopped thereon is said second carrier.

18. The subscriber unit of claim 17 wherein said means for synchronizing to the signalling channel of a neighboring coverage area further comprises means for measuring the quality of said signalling channel of a neighboring coverage area for purposes of communication handoff.

19. The subscriber unit of claim 18 wherein said means for measuring the quality of said signalling channel of a neighboring coverage area for purposes of communication handoff further comprises for measuring the bit error rate said training sequence for purposes of communication handoff.

20. The subscriber unit of claim 12 wherein the subscriber unit has no a priori knowledge of the hopping sequence.

21. A slow frequency hopping time division multiple access communication system, the communication system employing a base-station for communicating to a plurality of subscriber units, the subscriber units requiring access to the base-station to establish communication, the communication system comprising:

means, at the base-station, for producing a hopping sequence for frequency hopping from a TDMA frame to a TDMA frame;

means, coupled to said means for producing a hopping sequence, for transmitting both the signalling channel and the plurality of traffic channels over a plurality of carriers in a frequency hopping manner utilizing said determined hopping sequence;

means, at a subscriber unit, for accessing a carrier out of said plurality of carriers having said both the signalling channel and the traffic channels frequency hopped thereon;

means, coupled to said means for accessing, for synchronizing to the signalling channel when a carrier having the signalling channel hopped thereon is said firs; carrier and means, after synchronization has been acquired, for obtaining information related to said hopping sequence.

22. The communication system of claim 21 wherein said means for obtaining information related to said hopping sequence further comprises means for further obtaining system information related to access of the SFH TDMA communication system for establishment of communication between said base-station and said subscriber unit.

* * * * *